(12) United States Patent
Wakizaka et al.

(10) Patent No.: US 10,522,821 B2
(45) Date of Patent: *Dec. 31, 2019

(54) GRAPHITE POWER FOR NEGATIVE ELECTRODE ACTIVE MATERIAL OF LITHIUM-ION SECONDARY BATTERY

(71) Applicant: SHOWA DENKO K.K., Minato-ku, Tokyo (JP)

(72) Inventors: Yasuaki Wakizaka, Tokyo (JP); Yuichi Kamijo, Tokyo (JP); Daisuke Kono, Tokyo (JP); Yoshikuni Sato, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 55 days.

This patent is subject to a terminal disclaimer.

(21) Appl. No.: 15/983,462

(22) Filed: May 18, 2018

(65) Prior Publication Data

US 2018/0269469 A1  Sep. 20, 2018

Related U.S. Application Data

(62) Division of application No. 14/765,510, filed as application No. PCT/JP2014/052401 on Feb. 3, 2014, now Pat. No. 9,997,769.

(30) Foreign Application Priority Data

Feb. 4, 2013 (JP) ................................. 2013-019980
Mar. 15, 2013 (JP) ................................. 2013-053788

(51) Int. Cl.
*H01M 4/133* (2010.01)
*H01M 4/1393* (2010.01)
(Continued)

(52) U.S. Cl.
CPC ............. *H01M 4/133* (2013.01); *C01B 32/20* (2017.08); *H01M 4/043* (2013.01);
(Continued)

(58) Field of Classification Search
CPC ...................................................... C01B 32/20
See application file for complete search history.

(56) References Cited

U.S. PATENT DOCUMENTS 5,587,255 A  12/1996 Sonobe et al.
6,344,296 B1  2/2002 Ishii et al.
(Continued)

FOREIGN PATENT DOCUMENTS

JP  04-190555 A  7/1992
JP  05-307977 A  11/1993
(Continued)

OTHER PUBLICATIONS

Communication dated Mar. 14, 2018 from the German Patent Office in counterpart German application No. 11 2014 000 661.0.
(Continued)

*Primary Examiner* — Jeremiah R Smith
(74) *Attorney, Agent, or Firm* — Sughrue Mion, PLLC

(57) ABSTRACT

A graphite powder, preferably including scale-like particles, which satisfies the following formulae (1) and (2), wherein e(0.5) represents the initial charge-discharge efficiency of a coin cell fabricated from an electrode (work electrode) produced by compressing an electrode material employing graphite powder as an active material under a pressure of 0.5 t/cm², a lithium metal counter electrode, a separator and an electrolytic solution; and e(3) represents the initial charge-discharge efficiency of a coin cell fabricated from an electrode (work electrode) produced by compressing an electrode material employing graphite powder as an active material under a pressure of 3 t/cm², a lithium metal counter electrode, a separator and an electrolytic solution:

$$e(3)(\%) - e(0.5)(\%) \geq 1,$$  formula (1):

$$e(3)(\%) > 85.$$  formula (2):

(Continued)

Also disclosed is a method of producing the graphite powder; a graphite material for a battery electrode; an electrode for a lithium ion; and a lithium-ion secondary battery.

11 Claims, 1 Drawing Sheet

(51) Int. Cl.
  *H01M 4/587* (2010.01)
  *H01M 4/04* (2006.01)
  *C01B 32/20* (2017.01)
  *H01M 10/0525* (2010.01)
(52) U.S. Cl.
  CPC ......... *H01M 4/1393* (2013.01); *H01M 4/587* (2013.01); *C01P 2006/40* (2013.01); *H01M 10/0525* (2013.01)

(56) References Cited

U.S. PATENT DOCUMENTS

| | | |
|---|---|---|
| 6,632,569 B1 | 10/2003 | Kameda et al. |
| 2005/0158550 A1 | 7/2005 | Ohta et al. |
| 2009/0196816 A1 | 8/2009 | Yamamoto et al. |
| 2010/0086856 A1 | 4/2010 | Matsumoto et al. |

FOREIGN PATENT DOCUMENTS

| | | |
|---|---|---|
| JP | 07-320740 A | 12/1995 |
| JP | 09-129232 A | 5/1997 |
| JP | 10-158005 A | 6/1998 |
| JP | 2000-348726 A | 12/2000 |
| JP | 2001-023638 A | 1/2001 |
| JP | 3361510 B2 | 1/2003 |
| JP | 2003-272625 A | 9/2003 |
| JP | 3534391 B2 | 6/2004 |
| JP | 2011-082054 A | 4/2011 |
| JP | 5081335 B1 | 11/2012 |
| JP | 5266428 B1 | 8/2013 |
| WO | 03/064560 A1 | 8/2003 |
| WO | 2011/049199 A1 | 4/2011 |
| WO | 2012/077039 A1 | 6/2012 |
| WO | 2012/144617 A1 | 10/2012 |

OTHER PUBLICATIONS

International Search Report for PCT/JP2014/052401 dated Mar. 18, 2014 [PCT/ISA/210].

GRAPHITE POWER FOR NEGATIVE ELECTRODE ACTIVE MATERIAL OF LITHIUM-ION SECONDARY BATTERY

CROSS REFERENCE TO RELATED APPLICATIONS

This application is a Rule 53(b) Divisional of U.S. application Ser. No. 14/765,510 filed Aug. 3, 2015, which is a National Stage of International Application No. PCT/JP2014/052401 filed Feb. 3, 2014, claiming priority based on Japanese Patent Application Nos. 2013-019980 filed Feb. 4, 2013 and 2013-053788 filed Mar. 15, 2013, the contents of all of which are incorporated herein by reference in their entirety.

TECHNICAL FIELD

The present invention relates to a graphite powder, a graphite powder for a battery electrode, and a battery. More specifically, the present invention relates to a graphite powder which is suitable as an electrode material for a non-aqueous electrolytic solution secondary battery; a production method thereof; a graphite material for a battery electrode containing the graphite powder; an electrode for a lithium ion battery; and a lithium ion secondary battery excellent in charge/discharge cycle characteristics and large current load characteristics.

BACKGROUND ART

As a power source of a mobile device, or the like, a lithium ion secondary battery is mainly used. The function of the mobile device or the like is diversified, resulting in increasing in power consumption thereof. Therefore, a lithium ion secondary battery is required to have an increased battery capacity and, simultaneously, to have an enhanced charge/discharge cycle characteristic.

Further, there is an increasing demand for a secondary battery with a high output and a large capacity for electric tools such as an electric drill and a hybrid automobile. In this field, conventionally, a lead secondary battery, a nickel-cadmium secondary battery, and a nickel-hydrogen secondary battery are mainly used. A small and light lithium ion secondary battery with high energy density is highly expected, and there is a demand for a lithium ion secondary battery excellent in large current load characteristics.

In particular, in applications for automobiles, such as battery electric vehicles (BEV) and hybrid electric vehicles (HEV), a long-term cycle characteristic over 10 years and a large current load characteristic for driving a high-power motor are mainly required, and a high volume energy density is also required for extending a driving range (distance), which are severe as compared to mobile applications.

In the lithium ion secondary battery, generally, a lithium salt, such as lithium cobaltate, is used as a positive electrode active material, and a carbonaceous material, such as graphite, is used as a negative electrode active material.

Graphite is classified into natural graphite and artificial graphite.

Among those, natural graphite is available at a low cost. However, as natural graphite has a scale shape, if natural graphite is formed into a paste together with a binder and applied to a current collector, natural graphite is aligned in one direction. When an electrode made of such a material is charged, the electrode expands only in one direction, which degrades the performance of the electrode. Natural graphite, which has been granulated and formed into a spherical shape, is proposed, however, the resulting spherical natural graphite is aligned because of being crushed by pressing in the course of electrode production. Further, the surface of the natural graphite has high reaction activity, resulting in a low initial charge-discharge efficiency and poor cycle characteristics. In order to solve those problems, Patent Document 1 and the like propose a method involving coating carbon on the surface of the natural graphite processed into a spherical shape. However, sufficient cycle characteristics have not been attained.

Regarding artificial graphite, there is exemplified a mesocarbon microsphere-graphitized article described in Patent Document 2 and the like. However, the article has a lower discharge capacity compared to a scale-like graphite and had a limited range of application.

Artificial graphite typified by graphitized articles made of oil, coal pitch, coke and the like is available at a relatively low cost. However, although a crystalline needle-shaped coke shows a high discharge capacity, it tends to align in a scale shape and be oriented in an electrode. In order to solve this problem, the method described in Patent Document 3 and the like yield results.

Further, negative electrode materials using so-called hard carbon and amorphous carbon described in Patent Document 4 are excellent in a characteristic with respect to a large current and also have a relatively satisfactory cycle characteristic.

Patent Document 5 discloses artificial graphite being excellent in cycle characteristics.

Patent Document 6 discloses an artificial graphite negative electrode produced from needle-shaped green coke.

Patent Document 7 discloses an artificial graphite negative electrode produced from cokes coated with petroleum pitch in a liquid phase.

PRIOR ART

Patent Documents

Patent Document 1: JP 3534391 B2 (U.S. Pat. No. 6,632,569)
Patent Document 2: JP 04-190555 A
Patent Document 3: JP 3361510 B2
Patent Document 4: JP 07-320740 A (U.S. Pat. No. 5,587,255)
Patent Document 5: WO 2011/049199
Patent Document 6: JP-A-2001-23638
Patent Document 7: WO 2003/064560 (JP 2005-515957 A)

DISCLOSURE OF THE INVENTION

Problems to be Solved by the Invention

The material produced by the method described in Patent Document 1 can address a high-capacity, a low-current, and an intermediate-cycle characteristic required by the mobile applications, etc. However, it is very difficult for the material to satisfy the requests such as a large current and an ultralong-term cycle characteristic of a large battery as described above.

The graphitized article described in Patent Document 2 is a well-balanced negative electrode material, and is capable of producing a battery with a high capacity and a large current. However, it is difficult to achieve the cycle characteristic for a much longer period of time than the one for mobile applications, which is required for a large battery.

The method according to Patent Document 3 can allow the use of not only fine powder of an artificial graphite material but also fine powder of a natural graphite, or the like, and exhibits very excellent performance for a negative electrode material for the mobile applications. However, its production method is cumbersome.

The volume energy density of the negative electrode material described in Patent Document 4 is too low and the price of the material is very expensive, and thus, such negative electrode materials are only used for some special large batteries.

In Patent Document 5, there was room for improvement on the energy density per volume.

In Patent Document 6, although the initial charge-discharge efficiency showed some improvement compared to the case of using conventional artificial graphite, it was inferior in a discharge capacity compared to a natural graphite material.

In Patent Document 7, the electrode capacity density has remained as an issue to be solved. Also, the production involves an operation of using large quantities of organic solvent and evaporating it, which makes the production method cumbersome.

An object of the present invention is to provide a graphite powder for an electrode for a lithium secondary battery, which is excellent in the electrode capacity, initial charge-discharge efficiency and cycle capacity retention rate, and has a low degree of electrode expansion at the time of charge and discharge; and a graphite material for a battery electrode, an electrode for a lithium battery, and a lithium ion secondary battery using the graphite powder.

Means to Solve the Problem

The present invention relates to a graphite powder described in the following [1] to [6], a method for producing the graphite powder described in [7] to [12], a graphite material for a battery electrode described in [13], an electrode for a lithium battery described in [14] to [15], and a lithium ion secondary battery described in [16].

[1] A graphite powder which satisfies the conditions expressed by the following formulae, wherein e(0.5) represents an initial charge-discharge efficiency of a coin cell fabricated from an electrode (work electrode) produced by compressing an electrode material employing graphite powder as an active material under a pressure of 0.5 t/cm$^2$, a lithium metal counter electrode, a separator and an electrolytic solution; and e(3) represents an initial charge-discharge efficiency of a coin cell fabricated from an electrode (work electrode) produced by compressing an electrode material employing graphite powder as an active material under a pressure of 3 t/cm$^2$, a lithium metal counter electrode, a separator and an electrolytic solution:

$$e(3)(\%)-e(0.5)(\%) \geq 1 \quad (1)$$

$$e(3)(\%) > 85 \quad (2)$$

[2] The graphite powder as described in [1] above, wherein the total pore volume by the nitrogen gas adsorption method is 8.0 µl/g to 20.0 µl/g.

[3] The graphite powder as described in [1] or [2] above, which graphite powder has a carbon coating layer on its surface.

[4] A graphite powder, wherein the total pore volume by the nitrogen gas adsorption method is 8.0 µl/g to 20.0 µl/g, the particles of which are scale-like particles.

[5] The graphite powder as described in any one of [1] to [4] above, wherein the graphite powder has an electrode expansion rate of 100 to 130% expressed by the following formula:

Electrode expansion rate (%)={(T500/T10)}×100, wherein T10 represents a thickness of the layer of the negative electrode active material after performing 10 cycles and T500 represents a thickness of the layer of the negative electrode active material after performing 500 cycles in charge and discharge cycles with a lithium ion battery fabricated by using the graphite powder as a negative electrode active material.

[6] A graphite powder made by compressing the graphite powder described in any one of [1] to [5] above under pressure of 1.5 to 5 t/cm$^2$.

[7] A method for producing the graphite powder described in any one of [1] to [6] above, comprising a process of graphitizing the scale-like coke at 2,400 to 3,600° C. and a process of bringing the coke into contact with oxygen under heating.

[8] The method for producing a graphite powder as described in [7] above, wherein the process of bringing the coke into contact with oxygen under heating is to bring the coke into contact with oxygen at the time of heating for graphitization.

[9] The method for producing a graphite powder as described in [7] above, wherein the process of bringing the coke into contact with oxygen under heating is to bring the coke into contact with oxygen during the cooling process after the heating for graphitization.

[10] The method for producing a graphite powder as described in [7] above, wherein the process of bringing the coke into contact with oxygen under heating is to bring the coke into contact with oxygen during an independent heating treatment after the completion of the graphitization process.

[11] The method for producing a graphite powder as described in any one of [7] to [10] above, comprising dry mixing of one or more member of carbon materials selected from petroleum pitch, coal pitch and phenol resin with coke before the graphitization.

[12] The method for producing a graphite powder as described in [11] above, wherein the petroleum pitch or coal pitch contains a quinoline insoluble component in an amount of 10 mass % or less and a beta-resin component in an amount of 20 mass % or more.

[13] A graphite material for a battery electrode containing the graphite powder described in any one of [1] to [6] above.

[14] An electrode for a lithium battery, which is obtained by applying a paste containing the graphite material for a battery electrode described in [13] above and a binder on a current collector, drying the paste and then compressing the electrode.

[15] The electrode for a lithium battery as described in [14] above, which is obtained by applying a paste containing the graphite material for a battery electrode described in 13 above and a binder on a current collector, drying the paste and then compressing the electrode under a pressure of 1.5 to 5 t/cm$^2$.

[16] A lithium ion secondary battery comprising the electrode described in [14] or [15] above.

Effects of the Invention

Use of the graphite powder of the present invention as a graphite material for a battery electrode makes it possible to obtain a negative electrode for a lithium ion battery having a high capacity and high electrode density, being excellent in the initial charge-discharge efficiency and the capacity retention rate, and having a low electrode expansion rate in charge and discharge cycles.

The graphite powder of the present invention can be produced by the method being excellent in economic efficiency and mass productivity with improved safety, comprising the oxidation process conducted in the same apparatus as that in the graphitization process.

MODE FOR CARRYING OUT THE INVENTION (1) Graphite Powder

A negative electrode for a secondary battery is required to have a high capacity per unit volume. One method for improving a capacity of a negative electrode is to improve a capacity per mass of graphite. With a higher degree of graphite crystallinity, the capacity per mass of graphite tends to increase.

Another method to improve a capacity per volume of a negative electrode is to increase the amount of the active material per electrode volume: i.e. the electrode density. Generally, an electrode for a battery is produced by drying an active material applied onto a current collector plate and subsequent pressing. In addition to improving the filling property of the active material per volume by pressing, when the active material is soft enough to be deformed to some degree by pressing, it is possible to significantly increase the electrode density. With increase in the degree of graphite crystallinity and thickness of the crystal in the direction of C-axis (Lc), the electrode density tends to be improved. However, even if the electrode density is high at the time of fabricating a battery, the battery cannot be eventually downsized in some cases due to the expansion of the electrode while repeating charge and discharge. Accordingly, the active material of a negative electrode is required to have a low electrode expansion rate.

The graphite powder in a preferred embodiment of the present invention comprises scale-like graphite particles.

The scale-like graphite particles in the present invention indicate graphite particles having a median aspect ratio of 1.4 or higher with respect to 10,000 or more particles measured in LPF mode using FPIA-3000 manufactured by Sysmex Corporation. Here, the aspect ratio of the particle is expressed by the following formula when the long axis denotes the longest line segment inside the projected image of the particle, and the longest vertical axis denotes the longest line segment among the line segments perpendicular to the long axis inside the projected image of the particle: aspect ratio=length of the long axis/length of the longest vertical axis. On the other hand, a graphite particle having a median aspect ratio of less than 1.4 is referred to as a lump particle.

The graphite powder in a preferred embodiment of the present invention has an average interplanar spacing (d002) of plane (002) by the X-ray diffraction method of 0.340 nm or less and a thickness of a crystal in the direction of C-axis (Lc) of 50 nm or more and 1,000 nm or less. By setting the d002 and Lc to be within the above-mentioned range, it is possible to improve the discharge capacity per mass of an electrode using the graphite powder as an active material and to improve the electrode density by pressing. When d002 exceeds 0.337 nm or Lc is less than 50 nm, the capacity per volume tends to decrease. d002 is 0.338 nm or less and Lc is 80 nm or more and 1,000 nm or less in a more preferred embodiment, and d002 is 0.336 nm or less and Lc is 90 nm or more and 1,000 nm or less in the most preferred embodiment.

d002 and Lc can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "Tanso", 1963, No. 36, pages 25-34).

The median diameter (D50) of the graphite powder in a preferred embodiment of the present invention is 1 μm or more and 50 μm or less. Pulverizing by special equipment is required to make D50 less than 1 μm and more energy is required as a result. By setting D50 to 50 μm or less, lithium ion diffusion in an electrode made from the powder is accelerated, resulting in the increase in the charging and discharging rate. A preferred D50 value is from 5 μm or more and 35 μm or less. Setting D50 to 10 μm or more is more preferable because it prevents an unintended reaction. From the viewpoint that generation of a large current is necessary for the graphite powder to be used in the power source of the drive force and the like, D50 is preferably 25 μm or less.

In the preferred embodiment of the present invention, as pulverization is not performed after graphitization, a rhombohedral peak ratio is 5% or less, more preferably 1% or less.

When the graphite material falls in such ranges, an intercalation compound with lithium is formed smoothly. If the graphite material in the above ranges is used as a negative electrode material in a lithium ion secondary battery, the lithium occlusion/release reaction is hardly inhibited, which enhances a rapid charging/discharging characteristic.

It should be noted that the peak ratio (x) of the rhombohedral structure in the graphite powder is obtained from actually measured peak strength (P1) of a hexagonal structure (100) plane and actually measured peak strength (P2) of a rhombohedral structure (101) plane by the following expression.

$$x=P2/(P1+P2)$$

In a preferred embodiment of the present invention, the BET specific surface area of the graphite powder is 0.4 m$^2$/g to 5 m$^2$/g, more preferably 0.5 m$^2$/g to 3.5 m$^2$/g and still more preferably 1 m$^2$/g to 3.0 m$^2$/g. By setting the BET specific surface area to be within the above-mentioned range, a wide area to be contacted with an electrolytic solution can be secured without excessive use of a binder and lithium ions can be smoothly intercalated and released, and the rapid charge and discharge characteristics can be improved with lowering the reaction resistance of the battery. The BET specific surface area is measured by a common method of measuring the adsorption and desorption amount of gas per unit mass. As a measuring device, for example, NOVA-1200 can be used, and the BET specific surface area can be measured by nitrogen adsorption.

In the graphite powder in a preferred embodiment of the present invention, pores are generated and enlarged by undergoing a moderate oxidation, and therefore the total pore volume measured by the nitrogen gas adsorption method with liquid nitrogen cooling is found to be 8.0 μl/g to 20.0 μl/g. At this time, the electrolytic solution is allowed to impregnate easily and the rapid charge and discharge characteristics are improved at the same time. When the total pore volume is 8.0 μl/g or more, the negative electrode obtained from the graphite powder can attain a high initial charge-discharge efficiency, in which a side reaction is less likely to occur. When the total pore volume is 20.0 μl/g or less in a graphite powder having an Lc value of 100 nm or more measured by the X-ray diffraction method, irreversible change of the structure due to the anisotropic expansion and contraction in the graphite layer at the time of charging and discharging is less likely to occur, which further improves cycle characteristics and suppresses the electrode expansion during charging and discharging. In a more preferred embodiment, the total pore volume is 8.5 μl/g to 17.0 μl/g. In the most preferred embodiment, the total pore volume is 8.7 μl/g to 15.0 μl/g.

By compressing the electrode employing as an active the graphite powder in a preferred embodiment of the present invention under a moderate pressure, the contact between the graphite particles are more stabilized, resulting in an improved initial charge-discharge efficiency.

For example, the above graphite powder is characterized in satisfying the conditions expressed by the following formulae when e(0.5) represents the initial charge-discharge efficiency of a coin cell fabricated from an electrode (work electrode) produced by compressing an electrode material employing graphite powder as an active material under a pressure of 0.5 t/cm², a lithium metal counter electrode, a separator and an electrolytic solution; and e(3) represents the initial charge-discharge efficiency of a coin battery fabricated from an electrode (work electrode) produced by compressing an electrode material employing graphite powder as an active material under a pressure of 3 t/cm², a lithium metal counter electrode, a separator and an electrolytic solution:

$$e(3)(\%) - e(0.5)(\%) \geq 1 \quad (1)$$

$$e(3)(\%) > 85 \quad (2)$$

A more preferable graphite powder satisfies:

$$e(3)(\%) - e(0.5)(\%) > 2 \text{ and } e(3)(\%) > 86.$$

The most preferable graphite powder satisfies:

$$e(3)(\%) - e(0.5)(\%) \geq 3 \text{ and } e(3)(\%) > 87.$$

Also, the discharge capacity per mass of the above mentioned active material in the initial cycle of the coin battery when the electrode is made by compressing the electrode material under a pressure of 3 t/cm² is preferably 335 mAh/g or more, more preferably 340 mAh/g or more and still more preferably 345 mAh/g or more.

In the graphite powder in a preferred embodiment of the present invention, the shape of the graphite surface comes to be suitable for stabilizing the contact structure of the graphite particles in the electrode by compressing the graphite powder in a powdery state before producing the electrode, thereby improving the initial charge-discharge efficiency of the electrode employing the graphite powder as an active material. With respect to the compression at this time, it is desirable to compress the graphite powder filled in a container under a pressure of 1.5 t/cm² to 5 t/cm² for 30 seconds, more preferably under a pressure of 2 t/cm² to 5 t/cm² for 30 seconds. When the compression pressure is too high, the particles collapse, thereby lowering the initial charge-discharge efficiency.

With respect to the graphite powder in a preferred embodiment of the present invention, when an electrode employing the graphite powder as an active material is compressed under a pressure of 3 t/cm² by a method described in Examples, the work electrode is to have an electrode density of 1.3 to 2.1 g/cm³. The electrode density is more preferably 1.5 to 2.1 g/cm³, and particularly preferably 1.7 to 2.1 g/cm³.

The graphite powder of the present invention may have a carbon coating layer on the particle surface of the graphite powder. By having a carbon coating layer, it is possible to improve the cycle characteristics, charging state retention characteristics and rapid charge-discharge characteristics of the electrode made from the graphite powder, and to suppress the electrode expansion during charging and discharging.

The graphite powder in a preferred embodiment of the present invention can suppress an adverse reaction inside the battery when a lithium ion battery is fabricated using the graphite powder as a negative electrode active material. When T10 represents the thickness of the layer of the negative electrode active material after performing 10 cycles and T500 represents the thickness of the layer of the negative electrode active after performing 500 cycles, respectively, in charging and discharging cycles, the electrode expansion rate expressed by the following formula becomes 100 to 130%.

$$\text{Electrode expansion rate } (\%) = \{(T500/T10)\} \times 100$$

The electrode expansion rate is 100 to 125% in a more preferred embodiment and 100 to 122% in a most preferred embodiment.

(2) Method for Producing a Graphite Powder

There is no particular limitation for a method for producing a graphite powder and, for example, a method described below is suitable.

A calcined or green coke can be used as a raw material for a graphite powder. As a raw material of the coke, for example, petroleum pitch, coal pitch, coal pitch coke, petroleum coke and a mixture thereof can be used. Among these, preferred is the coke obtained by a delayed coking process under specific conditions and the subsequent heating under an inert atmosphere.

Examples of raw materials to pass through a delayed coker include decant oil which is obtained by removing a solvent after the process of fluidized-bed catalytic cracking to heavy distillate at the time of crude refining, and tar obtained by distilling coal tar extracted from bituminous coal and the like at a temperature of 200° C. or more and heating it to 100° C. or more to impart sufficient flowability. It is desirable that these liquids are heated to 450° C. or more, or even 510° C. or more, during the delayed coking process, at least at an inlet of the coking drum in order to increase the residual ratio of the coke at the time of calcination. Also, pressure inside the drum is kept at preferably an ordinary pressure or higher, more preferably 300 kPa or higher, still more preferably 400 kPa or higher to increase the capacity of a negative electrode. As described above, by performing coking under more severe conditions than usual, the reaction of the liquids is further enhanced and coke having a higher degree of polymerization can be obtained.

The obtained coke is to be cut out from the drum by water jetting, and roughly pulverized to lumps about the size of 5 centimeters with a hammer and the like. A double roll crusher and a jaw crusher can be used for the rough pulverization, and it is desirable to pulverize the coke so that the particles larger than 1 mm in size account for 90 mass % or more of the powder. If the coke is pulverized too much to generate a large amount of fine powder having a diameter of 1 mm or less, problems such as the dust stirred up after drying and the increase in burnouts may arise in the subsequent processes such as heating.

Next, the roughly pulverized coke may be subjected to calcination. The calcination means to perform heating to remove moisture and organic volatile.

When the calcined coke is subjected to graphitization, it promotes the development of crystals and is desirable.

The calcination can be performed by electric heating and flame heating of LPG, LNG, heating oil and heavy oil. Since a heat source of 2,000° C. or less is sufficient to remove moisture and organic volatile, flame heating as an inexpensive heat source is preferable for mass production. When the treatment is performed on a particularly-large scale, energy cost can be reduced by an inner-flame or inner-heating type heating of coke while burning fuel and the organic volatile contained in the unheated coke in a rotary kiln.

In a raw material coke in a preferred embodiment of the present invention, it is desirable for the optical structures to satisfy 2.0<AR(60), more preferably 2.2≤AR(60), and most preferably 2.25≤AR(60) when they are observed under a polarizing microscope. When the raw material is green coke, the observation under a polarizing microscope is performed after conducting the heat treatment at 1,100° C. By using such coke as a raw material, the graphite powder has a higher Lc value by graphitization, which can increase the electrode density.

Here, AR(60) indicates the aspect ratio determined as follows: in the case where the individual optical structures in the cross-section of the green coke or calcined coke as a raw material subjected to the heat treatment at 1,100° C. are observed under a polarizing microscope, when areas of the optical structures are accumulated from the smallest structure in an ascending order, AR(60) represents the aspect ratio of an optical structure whose accumulated area corresponds to 60% of the total area of all the optical structures. In the observation under a polarizing microscope, a lump of calcined coke larger than several millimeters in size is embedded in resin and subjected to mirror finishing and the like to observe the cross-section thereof. Also, the observation can be conducted by the method described in, for example, "Modern Carbon Material Experimental Technology (Analysis part) edited by The Carbon Society of Japan (2001), published by Sipec Corporation, pages 1-8" and the like. When artificial graphite is produced using the coke that satisfies such conditions as a raw material, the particles of the obtained artificial graphite tend to become scale-like as in FIG. 1. Here, the resin embedding, mirror finishing, observation under a polarizing microscope and extraction of optical structures are conducted as described below.

[Resin Embedding]

A double-sided adhesive tape is attached to the bottom of a sample container made of plastic with an internal volume of 30 cm³, and a coke particle several millimeters or larger in size is placed on the double-sided adhesive tape. A curing agent (Curing Agent (M-agent) (trade name), produced by Nippon Oil and Fats Co., Ltd., available from Marumoto Struers K.K.) is added to cold mounting resin (Cold mounting resin #105 (trade name), produced by Japan Composite Co., Ltd., available from Marumoto Struers K.K.), and the mixture is kneaded for 30 seconds. The resultant mixture (about 5 ml) is poured slowly to the sample container to a height of about 1 cm and allowed to stand still for one day to be solidified. Next, after the solidification, the solidified sample is taken out from the container and the double-sided adhesive tape is peeled off.

[Mirror Finishing]

A surface to be measured is polished with a polishing machine with a rotary polishing plate. The polishing is performed so that the polishing surface is pressed against the rotary surface. The polishing plate is rotated at 1,000 rpm. The polishing is performed successively, using #500, #1000, and #2000 of the polishing plates in this order, and finally, mirror-surface polishing is performed, using alumina (BAIKALOX type 0.3CR (trade name) with a particle diameter of 0.3 μm, produced by BAIKOWSKI, available from Baikowski Japan). The polished sample is fixed onto a preparation with clay and observed with a polarizing microscope (BX51, produced by Olympas Corporation).

[Polarizing Microscope Image Analysis Method]

The observation was performed at 200-fold magnification. An image observed with the polarizing microscope is photographed by connecting a CAMEDIA C-5050 ZOOM digital camera produced by Olympas Corporation to the polarizing microscope through an attachment. The shutter time is 1.6 seconds. Among the photographed data, images of 1,200×1,600 pixels were used for the analysis. It corresponds to investigation in a microscope field of 480 μm×540 μm.

[Extraction of Optical Structures]

The image analysis was performed using ImageJ (National Institutes of Health) to discriminate blue portions, yellow portions, magenta portions and black portions. The parameters defining each color for the use of ImageJ are given below.

TABLE 1

|  | Hue value | Saturation value | Brightness value |
|---|---|---|---|
| Blue | 150 to 190 | 0 to 255 | 80 to 255 |
| Yellow | 235 to 255 | 0 to 255 | 80 to 255 |
| Magenta | 193 to 255 | 180 to 255 | 120 to 255 |
| Black | 0 to 255 | 0 to 255 | 0 to 120 |

The statistical processing with respect to the detected structures is performed using an external macro-file. The black portions, that is, portions corresponding not to optical structures but to resin are excluded from the analysis, and the aspect ratio of each of blue, yellow and magenta optical structures are to be calculated. Here, the aspect ratio of individual optical structures is defined as follows: When a long axis denotes the longest line segment inside the optical structure shape extracted from the polarizing microscope image, and the quadrangle, the two sides of which are line segments parallel to the long axis, is circumscribed to the optical structure shape, the aspect ratio is calculated from the long side and short side of the quadrangle as in the following expression: (aspect ratio)=(length of the long side)/(length of the short side).

There is no limitation for the pulverization of the calcined coke and, for example, it can be conducted as follows:

There is not particular limit to the method of pulverization, and pulverization can be performed using a known jet mill, hammer mill, roller mill, pin mill, vibration mill or the like.

It is desirable to perform pulverization so that coke has a median particle diameter based on a volume (D50) by the laser diffraction method of from 1 μm to 50 μm. To perform pulverization to make D50 less than 1 μm, it requires use of specific equipment and a large amount of energy. By setting D50 to 50 μm or less, it accelerates the lithium ion diffusion, thereby increasing the charge and discharge rate. D50 is more preferably from 5 μm to 35 μm. Setting D50 to 10 μm or more is more preferable because it is less likely to give rise to an unintended reaction. Considering that generation of a large current is required when the graphite powder is for use in the power source of the drive force and the like, D50 is preferably 25 μm or less.

Graphitization is conducted after the pulverization.

In the case of forming a carbon coating layer on the particle surface of the graphite powder, for example, at least one coating material selected from petroleum pitch, coal pitch and phenol resin is mixed with the pulverized calcined coke before graphitization.

It is desirable for petroleum pitch or coal pitch used as the above-mentioned coating material to contain 20 mass % or more of beta-resin component and 10 mass % or less of quinoline insoluble component. By using such pitch, pitch spreads uniformly on the graphite surface at the time of heating and an effective carbon coating layer is formed, which contributes to improvement in the discharge capacity, initial charge-discharge efficiency, charging-status retention characteristics and cycle characteristics, and to suppression of the electrode expansion. In a more preferred embodiment, the pitch contains 25 mass % or more of beta-resin component and 7 mass % or less of quinoline insoluble component. In the most preferred embodiment, the pitch contains 30 mass % or more of beta-resin component and 4 mass % or less of quinoline insoluble component.

The phenol resin used as the above-mentioned coating material is preferably thermoplastic.

By using such a coating material, it spreads uniformly on the graphite surface at the time of heating and an effective carbon coating layer is formed, which contributes to improvement in the discharge capacity, initial charge-discharge efficiency, charging-status retention characteristics and cycle characteristics, and to suppression of the electrode expansion. It is more preferable to mix petroleum pitch and coal pitch in addition to phenol resin because it allows phenol resin to spread more uniformly on the graphite surface.

Mixing of the particles obtained by pulverizing the calcined coke and the particles obtained by pulverizing the above-mentioned coating material may be mixed either by a wet method or a dry method.

When the mixing is performed by a wet method, for example, the coating material is dissolved or dispersed in a solvent and after adding the calcined coke there to, the solvent is removed by drying. Note that an organic solvent is used in a wet method, which requires careful handling, and it is necessary to prevent the solvent from evaporation and to collect the solvent. Therefore, it is desirable to perform the mixing in a dry method in which a solvent is not used.

When the mixing is performed in a dry method, it is desirable to perform the mixing with a certain force that will hardly pulverize the particles obtained by pulverizing the calcined coke in order to make sure that the particles obtained by pulverizing calcined coke and the particles obtained by pulverizing the coating material are fully mixed. For mixing, in addition to a mixer having a small pulverizing power such as a planetary centrifugal mixer, a planetary mixer and a Henschel mixer, a mixer with a detuned pulverization performance by controlling the liner part, blades and number of rotations of a hammer mill, a impeller mill and the like can be suitably used. Among these, a hammer mill and an impeller mill have a high mixing power and suitable for performing the dry-method coating treatment continuously in a short time. In mixing by a dry method, a smooth film owing to the coating material is not formed in some cases. However, the coating material is softened by the heating for the graphitization, spreads over the surface of the particles obtained by pulverizing the calcined coke and becomes a smooth film.

The volume-based median diameter by laser diffraction method of the particles obtained by pulverizing petroleum pitch or coal pitch (D50) is smaller than that of the particles obtained by pulverizing calcined coke (D50) and is preferably 0.01 μm to 25 μm. Making the particle diameter of the coating material excessively small not only causes the agglomeration of particles but also could cause dust explosion. D50 is more preferably 0.5 μm or more and still more preferably 1.0 μm or more. To make the formed film more uniform and denser, D50 is preferably 10 μm or less and more preferably 5 μm or less.

When Dc represents the median diameter (D50) of the particles obtained by pulverizing calcined coke and Dp represents that of the particles obtained by pulverizing petroleum pitch or coal-tar pitch, setting Dc/Dp value from 1.5 or more and less than 200 enables forming a more uniform film and is desirable. By setting the Dc/Dp value less than 200, a sufficient amount of coating material particles can be deposited on the calcined coke. Dc/Dp is preferably 50 or less and more preferably 15 or less. Considering the balance between the amount of the particles obtained by pulverizing the calcined coke and the amount of the particles of the coating material to be deposited thereon, Dc/Dp is preferably 3 or more and more preferably 8 or more.

The compounding ratio of the particles obtained by pulverizing the coating material is preferably 0.5 mass % or more and 15 mass % or less of the total mass of the particles obtained by pulverizing the calcined coke and the particles obtained by pulverizing the coating material from the viewpoint of the capacity per volume of an electrode. The compounding ratio is more preferably 1 mass % or more and 5 mass % or less from the viewpoint of rapid charge-discharge characteristics and charging-status retention characteristics, and still more preferably 1.2 mass % or more and 2.5 mass % or less from the viewpoint of the capacity per volume.

By graphitizing the pulverized calcined coke and a coating material at the same time, the process can be simplified compared to the case where a carbonization process is separately provided after the coating.

The coating material can be carbonized by conducting calcination at 500° C. to 1,500° C. after mixing the coating material. By this, the decrease in mass at the time of graphitization treatment can be reduced and therefore the throughput at one time in a graphitization treatment apparatus can be increased.

Graphitization is performed at a temperature of 2,400° C. or higher, more preferably 2,800° C. or higher, and still more preferably 3,050° C. or higher, and the most preferably 3,150° C. or higher. The treatment at a higher temperature further promotes the development of the graphite crystals and an electrode having a higher storage capacity of lithium ion can be obtained. On the other hand, if the temperature is too high, it is difficult to prevent the sublimation of the graphite powder and an unduly large amount of energy is required. Therefore, the graphitization temperature is preferably 3,600° C. or lower.

It is desirable to use electric energy to attain the above temperature. Electric energy is more expensive than other heat sources and in particular to attain a temperature of 2,000° C. or higher, an extremely large amount of electricity is consumed. Therefore, it is preferable not to consume the electric energy except for graphitization, and to calcine the carbon material prior to the graphitization to remove the organic volatile content: i.e. to make the fixed carbon content be 95% or more, preferably 98% or more, and still more preferably 99% or more.

The graphitization treatment is conventionally carried out under atmosphere without containing oxygen, for example, in a nitrogen-sealed environment and an argon-sealed environment. In contrast, in the present invention, it is preferable to perform the graphitization treatment in an environment with a certain concentration of oxygen or to perform oxidation treatment after the graphitization process. Generally, graphite has high activity sites such as a dandling bond and the high activity sites become a cause of adverse reaction inside a battery and caused decrease in the initial charge-discharge efficiency, cycle characteristics and charging-status retention characteristics, as well as expansion of electrode during charging and discharging. In the graphite powder of the present invention, since the high activity sites are removed by oxidation reaction, there are fewer high activity sites on the particle surface of the graphite powder and adverse reaction inside the battery can be inhibited. As a result, it is possible to obtain a graphite powder which enables improvement in the initial charge-discharge efficiency, cycle characteristics and charging-status retention characteristics as well as suppression of electrode expansion during charging and discharging.

The method for producing a graphite powder of the present invention comprises a process of bringing coke with oxygen during heating, and specifically, the process can be conducted: (a) by bringing the coke into contact with oxygen during heating for graphitization, (b) by bringing the graphitized coke into contact with oxygen during the cooling process after the heating for graphitization, or (c) by bringing the graphitized coke into contact with oxygen during an independent heating treatment after the completion of the graphitization process.

Particularly, it is desirable to conduct the graphitization treatment and the oxidation treatment in the same apparatus by not substituting the air in the graphitization furnace with nitrogen and argon. By conducting graphitization treatment and oxidation treatment by such a method, high activity sites such as a dangling bond on the surface of the graphite powder are removed due to the oxidation of the surface of the graphite powder, and as a result, battery characteristics are improved. Also, since the process and apparatus can be simplified, the method is improved in economic efficiency, safety, and mass productivity.

There is no limitation for the graphitization treatment as long as it is performed in an environment with a certain oxygen concentration. The treatment can be carried out, for example, by a method of putting a material to be graphitized in a graphite crucible in a state that the top of the material is in contact with an oxygen-containing gas by not closing a lid; in a state that the graphite crucible is provided with multiple oxygen inlets having a diameter of 1 mm to 50 mm; or in a state that the graphite crucible is provided with multiple oxygen inlet pipes having a diameter of 1 mm to 50 mm which are connected to outside the crucible; in an Acheson furnace filled with a filler of carbon particles or graphite particles; and generating heat by passing a current through the material. In this case, in order to prevent the substances contained in the material to be graphitized from reacting explosively, or to prevent the explosively-reacted materials from being blown off, the crucible may be lightly shut off from the oxygen-containing gas by covering the top of the crucible with a carbonized or graphitized felt or porous plate. A small amount of argon or nitrogen may be allowed to flow into the furnace, however, it is preferable not to substitute the atmosphere completely with argon or nitrogen but to adjust the oxygen concentration in the vicinity of the surface of the material to be graphitized (within 5 cm) to 1% or more, preferably 1 to 20% in the graphitization process. As an oxygen-containing gas, air is preferable but a gas having a low oxygen concentration in which the oxygen concentration is adjusted to the above-mentioned level may be used as well. Using argon and nitrogen in a large amount requires energy for condensing the gas, and if the gas is caused to flow through, the heat required for the graphitization is to be exhausted out of the system and further energy is to be required. From the viewpoint of efficient use of energy and economic efficiency, it is preferable to perform the graphitization in an environment open to the atmosphere.

If the surface oxidation occurs after the graphitization, high activity sites such as a dangling bond on the surface of the graphite particles are removed, and the recombination of the carbon atom bond does not occur afterward. Accordingly, since there are few high activity sites on the surface of the obtained graphite powder, it serves as an electrode material which is less likely to cause adverse reaction inside a battery, enables improvement in the initial charge-discharge efficiency and cycle characteristics, and has a low degree of electrode expansion. Therefore, it is most desirable to cause the surface oxidation during cooling in the graphitization process or after the graphitization process. Particularly in the case of performing graphitization in an environment open to the atmosphere, it is desirable to design the furnace so that air flows into it during cooling the graphitizing furnace and the oxygen concentration in the furnace falls within 1 to 20%.

When oxidation treatment is performed separately after performing graphitization as in above (c), the treatment is performed in the presence of oxygen at a temperature of 500° C. or higher, at an oxygen concentration for a heating time as appropriate.

However, when the graphitization is carried out as described above, an impurity component derived from the material to be graphitized is likely to precipitate in the region being in contact with oxygen, and it is desirable to remove it. Examples of the method for removing the impurity include a method of removing the above-mentioned material in the region from the portion being in contact with an oxygen-containing gas to a predetermined depth. That is, the material underlying deeper than the predetermined depth is obtained as a graphite material. A determined depth is 2 cm, preferably 3 cm and more preferably 5 cm from the surface.

The material underlying deeper has few chances to be in contact with oxygen. It is preferable to obtain a graphite material within 2 m from the portion being contact with the oxygen-containing gas, more preferably within 1 m, and more preferably within 50 cm.

In a preferable embodiment of the present invention, as the high activity sites on the particle surface are inactivated by oxidation reaction, the material is not subjected to pulverizing treatment after graphitization. Note that the material may be de-agglomerated so that not to be pulverized after the graphitization.

When an electrode is manufactured by employing as an active material the graphite powder produced by modifying the surface shape and surface activity of the particles through a moderate oxidation treatment in a preferred embodiment of the present invention, the contact between the adjacent graphite particles inside the electrode is stabilized by compressing the electrode. As a result, it is possible to make the electrode suitable for the repeated charging and discharging of a battery.

(3) Graphite Material for Battery Electrodes

The graphite material for battery electrodes in a preferred embodiment of the present invention contains the above-mentioned graphite powder. By using the graphite powder as a graphite material for a battery electrode, a battery electrode having a high energy density can be obtained in which electrode expansion during charging and discharging is suppressed, while maintaining a high capacity, a high coulomb efficiency and high cycle characteristics.

The graphite material for a battery electrode may be used as, for example, a negative electrode active material and an agent for imparting conductivity to a negative electrode of a lithium ion secondary battery.

The graphite material for battery electrodes in a preferred embodiment of the present invention may comprise the above-mentioned graphite powder only. It is also possible to use the materials obtained by blending spherical natural graphite or artificial graphite having d002 of 0.3370 nm or less in an amount of 0.01 to 200 parts by mass and preferably 0.01 to 100 parts by mass; or by blending natural or artificial graphite (for example, graphite having a scale shape) having d002 of 0.3370 nm or less and aspect ratio of 2 to 100 in an amount of 0.01 to 120 parts by mass and preferably 0.01 to 100 parts by mass based on 100 parts by mass of the carbon material. By using the graphite material mixed with other graphite materials, the graphite material can be added with excellent properties of other graphite materials while maintaining the excellent characteristics of the graphite powder in a preferred embodiment of the present invention. With respect to mixing of these materials, the blending amount can be determined by appropriately selecting the materials to be mixed depending on the required battery characteristics.

Carbon fiber may also be mixed with the graphite material for battery electrodes. The mixing amount is 0.01 to 20 parts by mass, preferably 0.5 to 5 parts by mass in terms of total 100 parts by mass of the above-mentioned graphite powder.

Examples of the carbon fiber include: organic carbon fiber such as PAN-based carbon fiber, pitch-based carbon fiber, and rayon-based carbon fiber; and vapor-grown carbon fiber. Of those, particularly preferred is vapor-grown carbon fiber having high crystallinity and high heat conductivity. In the case of allowing the carbon fiber to adhere to the surfaces of the graphite powder, particularly preferred is vapor-grown carbon fiber.

Vapor-grown carbon fiber is, for example, produced by: using an organic compound as a material; introducing an organic transition metal compound as a catalyst into a high-temperature reaction furnace with a carrier gas to form fiber; and then conducting heat treatment (see, for example, JP 60-54998 A and JP 2778434 B2). The vapor-grown carbon fiber has a fiber diameter of 2 to 1,000 nm, preferably 10 to 500 nm, and has an aspect ratio of preferably 10 to 15,000.

Examples of the organic compound serving as a material for carbon fiber include toluene, benzene, naphthalene, ethylene, acetylene, ethane, natural gas, a gas of carbon monoxide or the like, and a mixture thereof. Of those, an aromatic hydrocarbon such as toluene or benzene is preferred.

The organic transition metal compound includes a transition metal serving as a catalyst. Examples of the transition metal include metals of Groups IVa, Va, VIa, VIIa, and VIII of the periodic table. Preferred examples of the organic transition metal compound include compounds such as ferrocene and nickelocene.

The carbon fiber may be obtained by pulverizing or shredding long fiber obtained by vapor deposition or the like. Further, the carbon fiber may be agglomerated in a flock-like manner.

Carbon fiber which has no pyrolysate derived from an organic compound or the like adhering to the surface thereof or carbon fiber which has a carbon structure with high crystallinity is preferred.

The carbon fiber with no pyrolysate adhering thereto or the carbon fiber having a carbon structure with high crystallinity can be obtained, for example, by sintering (heat-treating) carbon fiber, preferably, vapor-grown carbon fiber in an inactive gas atmosphere. Specifically, the carbon fiber with no pyrolysate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains branched fiber. Further, the fiber as a whole may have a portion having hollow structures communicated with each other. For this reason, carbon layers forming a cylindrical portion of the fiber are formed continuously. The hollow structure refers to a structure in which a carbon layer is wound in a cylindrical shape and includes an incomplete cylindrical structure, a structure having a partially cut part, two stacked carbon layers connected into one layer, and the like. Further, the cross-section is not limited to a complete circular cross-section, and the cross-section of the cylinder includes an oval cross-section or a polygonal cross-section.

Further, the average interplanar spacing d002 of a (002) plane by the X-ray diffraction method of the carbon fiber is preferably 0.344 nm or less, more preferably 0.339 nm or less, particularly preferably 0.338 nm or less. Further, it is preferred that a thickness ($L_c$) in a C-axis direction of crystal is 40 nm or less.

(4) Paste for Electrodes

The paste for an electrode of the present invention contains the above-mentioned graphite material for a battery electrode and a binder. The paste for an electrode can be obtained by kneading the graphite material for a battery electrode with a binder. A known device such as a ribbon mixer, a screw-type kneader, a Spartan Granulator, a Loedige Mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 30 parts by mass in terms of 100 parts by mass of the graphite material for a battery electrode, and in particular, the use amount is preferably about 3 to 20 parts by mass.

A solvent can be used at a time of kneading. Examples of the solvent include known solvents suitable for the respective binders such as: toluene and N-methylpyrrolidone in the case of a fluorine-based polymer; water in the case of SBR; dimethylformamide; and isopropanol. In the case of the binder using water as a solvent, it is preferred to use a thickener together. The amount of the solvent is adjusted so as to obtain a viscosity at which a paste can be applied to a current collector easily.

(5) Electrode

An electrode in a preferred embodiment of the present invention is formed of a molding of the above-mentioned paste for an electrode. The electrode is obtained, for example, by applying the paste for an electrode to a current collector, followed by drying and pressure molding.

Examples of the current collector include foils and mesh of aluminum, nickel, copper, stainless steel and the like. The coating thickness of the paste is generally 50 to 200 μm. When the coating thickness becomes too large, a negative electrode may not be accommodated in a standardized battery container. There is no particular limitation for the paste coating method, and an example of the coating method includes a method involving coating with a doctor blade or a bar coater, followed by forming with roll pressing or the like.

Examples of the pressure forming include roll pressurization, plate pressurization, and the like. The pressure for the pressure forming is preferably about 2 to 3 t/cm$^2$. Although the electrode density increases by higher compression, resulting in a higher battery capacity per volume, excessively high compression significantly degrades the cycle characteristics.

With respect to the graphite powder in a preferred embodiment of the present invention, in the case of obtaining an electrode by pressure forming using a paste, the degradation in the cycle characteristic is small even when the paste is compressed under a pressure higher than usual. Also, the graphite powder exhibits an extraordinary effect of improving the initial charge-discharge efficiency by compressing under higher pressure, which is different from the conventional technical knowledge. It is also certainly possible to improve the electrode density by compression.

Examples of the pressure forming include roll pressurization, plate pressurization, and the like. The pressure for the pressure forming is preferably about 1.5 to 5 t/cm$^2$, more preferably 2 to 5 t/cm$^2$, and still more preferably 2.5 to 4 t/cm$^2$. As the electrode density of the electrode increases, the battery capacity per volume generally increases. However, if the electrode density is increased too much, the cycle characteristic is generally degraded. If the graphite powder in a preferred embodiment of the present invention is used, the degradation in the cycle characteristic is small even when the electrode density is increased by high compression. Therefore, an electrode having the high electrode density can be obtained. The maximum value of the electrode density of the electrode obtained using the paste is generally 1.7 to 1.9 g/cm$^3$. The electrode thus obtained is suitable for a negative electrode of a battery, in particular, a negative electrode of a secondary battery.

If the compression is performed in a stage of graphite powder, it can improve the properties of an electrode made from the powder. In this case, the compression at the time of producing an electrode may be performed under a pressure within the usual range. That is, properties can be improved by performing appropriate compression in a stage of powder or after drying the paste.

The graphite powder of the present invention may be further mixed with a metal which is capable of forming alloy with alkali metal and/or a metallic substance comprising alkali metal alloy (hereinafter may be comprehensively referred to as "metallic substance") to be used. Examples of a metal which is capable of forming alloy with alkali metal, preferably with lithium metal, include aluminum (Al), lead (Pb), zinc (Zn), tin (Sn), bismuth (Bi), indium (In), magnesium (Mg), gallium (Ga), cadmium (Cd), silver (Ag), silicon (Si), boron (B), gold (Au), platinum (Pt), palladium (Pd), antimony (Sb) and the like. As alloy with alkali metal, preferably with lithium metal, when the alloy composition (molar composition) is expressed by Li$_x$M, (x: molar ratio with respect to metal M), the above-mentioned metals are used as M. The alloy may further contain elements other than the above-mentioned metals within a range of 50 mol % or less.

There is no particular limitation for the method for mixing graphite powder and a metallic substance, and a known method can be used. For example, a method disclosed in JP H05-286763 may be employed, and specifically, the following three methods may be employed.

(i) A method of combining or coating graphite powder and a metallic substance with a carbonaceous product, while forming the carbonaceous product by adding an organic compound to the mixture of the graphite powder and the metallic substance and heating the mixture to thereby carbonize the organic compound through a liquid phase. Examples of an organic compound include a condensed cyclic hydrocarbon compound in which two or more 3-membered or more homocyclic hydrocarbon compounds such as naphthalene, phenanthrene, anthracene, triphenylene, pyrene, chrysene, naphthacene, picene, perylene, pentaphene and pentacene are condensed into each other; and various pitch mainly comprising the mixture of the above-mentioned compounds. Example of the pitch include cracked pitch such as crude oil pitch, naphtha pitch, asphalt pitch, coal-tar pitch, polyvinyl chloride and polyvinylidene chloride. Examples of the organic compound further include a condensed heterocyclic compound in which two or more 3-membered or more heteromonocyclic compounds such as indole, isoindole, quinoline, isoquinoline, quinoxaline, phthalazine, carbazole, acridine, phanazine and Fenatorijin are bonded to each other; or bonded to one or more 3-membered or more homocyclic hydrocarbon compounds.

(ii) A method of combining or coating graphite powder and a metallic substance with a carbonaceous product, by combining or coating the mixture of the graphite powder and the metallic substance with an organic polymer compound, and then heating and degrading the mixture, thereby forming the carbonaceous product by means of carbonizing the mixture through a solid phase. Examples of an organic polymer include acrylic resin such as cellulose resin, phenol resin, furfuryl alcohol resin, polyacrylonitrile and poly(α-halogenated acrylonitrile); and conjugated resin such as polyamide resin, polyimide resin, polyacetylene, poly(p-phenylene) and poly(p-phenylene vinylene).

(iii) A method of combining or coating a graphite powder and a metallic substance with a carbonaceous product by forming the carbonaceous product on the mixture of graphite powder and the metallic substance through thermal decomposition of an organic compound in a gas phase. Examples of the organic compound to be used here include aliphatic hydrocarbon such as propane; an unsaturated hydrocarbon compound; an aromatic compound such as benzene, toluene and xylene; and carboxylic acid or a derivative such as carboxylic acid anhydride and carboxylic imide of an aromatic compound such as benzene and a condensed cyclic hydrocarbon compound such as naphthalene and perylene.

(6) Battery, Secondary Battery

A battery or a secondary battery can be produced, using the above-mentioned electrode as a constituent element (preferably, as a negative electrode).

The battery or secondary battery in a preferred embodiment of the present invention is described by taking a lithium ion secondary battery as a specific example. The lithium ion secondary battery has a structure in which a positive electrode and a negative electrode are soaked in an electrolytic solution or an electrolyte. As the negative electrode, the electrode in a preferred embodiment of the present invention is used.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co and Ni, which is a compound having a molar ratio of lithium to a transition metal of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula $Li_xMO_2$ (M represents at least one kind of Co, Ni, Fe, and Mn, and x is 0 to 1.2), or $Li_yN_2O_4$ (N contains at least Mn, and y is 0 to 2) be used.

Further, as the positive electrode active material, there may be particularly preferably used at least one kind of materials each including $Li_yM_aD_{1-a}O_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) or materials each having a spinel structure represented by $Li_z(N_bE_{1-b})_2O_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified $Li_xCoO_2$, $Li_xNiO_2$, $Li_xMnO_2$, $Li_xCo_aNi_{1-a}O_2$, $Li_xCo_bV_{1-b}O_2$, $Li_xCo_bFe_{1-b}O_2$, $Li_xMn_2O_4$, $Li_xMn_cCo_{2-c}O_4$, $Li_xMn_cNi_{2-c}O_4$, $Li_xMn_cV_{2-c}O_4$, and $Li_xMn_cFe_{2-c}O_4$ (where, x=0.02 to 1.2, a=0.1 to 0.9, b=0.8 to 0.98, c=1.6 to 1.96, and z=2.01 to 2.3). As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (x=0.02 to 1.2, a=0.1 to 0.9, b=0.9 to 0.98, and z=2.01 to 2.3). It should be noted that the value of x is a value before starting charge and discharge, and the value increases and decreases in accordance with charge and discharge.

Although the average particle size of the positive electrode active material is not particularly limited, the size is preferably 0.1 to 50 μm. It is preferred that the volume of the particles of 0.5 to 30 μm be 95% or more. It is more preferred that the volume occupied by the particle group with a particle diameter of 3 μm or less be 18% or less of the total volume, and the volume occupied by the particle group of 15 μm or more and 25 μm or less be 18% or less of the total volume.

Although the specific area is not particularly limited, the area is preferably 0.01 to 50 m$^2$/g, particularly preferably 0.2 m$^2$/g to 1 m$^2$/g by a BET method. Further, it is preferred that the pH of a supernatant obtained when 5 g of the positive electrode active material is dissolved in 100 ml of distilled water be 7 or more and 12 or less.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery in a preferred embodiment of the present invention, a known organic electrolytic solution, inorganic solid electrolyte, and polymer solid electrolyte may be used, but an organic electrolytic solution is preferred in terms of electric conductivity.

As an organic electrolytic solution, preferred is a solution of an organic solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, or ethylene glycol phenyl ether; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, 1,2-dimethoxyethane, or 1,3-dioxolan; a carbonate such as ethylene carbonate or propylene carbonate; γ-butyrolactone; N-methylpyrrolidone; acetonitrile; nitromethane; or the like. There are more preferably exemplified: esters such as ethylene carbonate, butylene carbonate, diethyl carbonate, dimethyl carbonate, propylene carbonate, vinylene carbonate, and γ-butyrolactone; ethers such as dioxolan, diethyl ether, and diethoxyethane; dimethylsulfoxide; acetonitrile; tetrahydrofuran; and the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these examples are merely for illustrative purposes, and the present invention is not limited thereto.

It should be noted that, as for the graphite powder of Examples and Comparative Examples, an average interplanar spacing (d002) by an X-ray diffraction method, a thickness of a crystal in the direction of C-axis (Lc), BET specific surface area, and AR(60) value are measured by the method described in detail in the "Mode for carrying out the Invention" of the specification. Further, the methods for measuring other physical properties are given below.

(1) Measurement of the Median Diameter (D50)

The volume-based median diameter (D50) is determined using Mastersizer produced by Malvern Instruments Ltd. as a laser diffraction type measurement device of particle size distribution.

(2) Measurement of Pore Volume

About 5 g of graphite powder is weighed out in a cell made of glass, and after drying it under reduced pressure of 1 kPa or less for about 3 hours to remove adsorbed components such as water, the mass of the graphite powder is measured. The nitrogen-gas adsorption isotherm of the graphite powder after drying with liquid nitrogen cooling is measured by Autosorb-1 manufactured by Quantachrome Instruments. A total pore volume is determined from the nitrogen adsorption amount at the measurement points of P/PO=0.992 to 0.995 and the mass of the graphite powder after drying.

(3) Evaluation Using a Coin Cell and Measurement of Electrode Density (a) Production of Paste:

To 97 parts by mass of the graphite powder, styrene butadiene rubber (SBR) and an aqueous solution of 2 mass % of carboxymethyl cellulose (CMC) are added in an amount of 1.5 parts by mass, respectively. The mixture is kneaded by a planetary mixer to obtain a main undiluted solution.

(b) Production of an Electrode:

Water is added to the main undiluted solution and the viscosity thereof is adjusted. After that, the resultant solution is applied to a high-purity copper foil. The foil is dried in vacuum at 120° C. for 1 hour to obtain an electrode material. The amount to be applied is adjusted so as to make the amount of the graphite powder be 5 mg/cm$^2$. The obtained electrode material is punched into circular pieces and compressed under a pressure of about 0.5 to 3 t/cm$^2$ for 10 seconds to obtain an electrode. D(P) denotes the density of the electrode layer excluding the current collector when the compression is performed under a pressure of P (t/cm$^2$).

(c) Production of a Battery:

A coin cell is fabricated comprising the obtained electrode as a work electrode and lithium metal as a counter electrode, further comprising a polyethylene separator, electrolytic solution and a case in a dry argon atmosphere at a dew point of −80° C. or less. As an electrolytic solution, a mixed solution of 8 parts by mass of ethylene carbonate (EC) and 12 parts by mass of diethyl carbonate (DEC) is used, in which 1 mol/liter of LiPF$_6$ is dissolved as an electrolyte.

(d) Charge and Discharge Test Using a Coin Cell:

The charge and discharge test of the above-mentioned work electrode is performed using the fabricated coin cell in in a thermostat bath set at 25° C.

First, after allowing a current of 0.05 C to pass until the open-circuit voltage reached 0.002 V, the charging is kept at 0.002 V and stopped when a current value drops to 25.4 μA to measure the charging capacity of the work electrode. Next, current of 0.05 C is allowed to pass until the open-circuit voltage reached 1.5 V. At that time, the ratio of the charging capacity and discharging capacity measured in the initial charge and discharge, i.e. discharging capacity/charging capacity in percentage was defined as the initial charge and discharge efficiency. e(P) denotes the initial charge and discharge efficiency when the compression in producing the above-mentioned electrode was performed under pressure of P t/cm$^2$ and C(P) denotes the discharging capacity in the initial charge and discharge to measure the following:

e(0.5) which represents the initial charge and discharge efficiency and C(0.5) which represents the discharging capacity in the initial charge and discharge in case where the above-mentioned electrode material was compressed under pressure of 0.5 t/cm$^2$, and e(3.0) which represents the initial charge and discharge efficiency and C(3.0) which represents the discharging capacity in the initial charge and discharge in case where the above-mentioned electrode material was compressed under pressure of 3.0 t/cm$^2$.

(3) Cycle Test

A battery comprising a negative electrode which is prepared in the same way as the work electrode is prepared in the charging and discharging test using a coin cell described in (2) above, lithium cobaltate as a positive electrode, further comprising an electrolytic solution and a polyethylene separator, is fabricated. Charge/discharge is repeated 1,000 times in a thermostat bath set at 45° C. The ratio of the maximum discharge capacity in each charge/discharge to the discharge capacity in the thousandth charge/discharge is referred to as the 1,000-cycle capacity retention rate and expressed in percent.

(4) Measurement of the Electrode Expansion Rate

The thickness of the layer of the negative electrode active material (T10) was measured by dismantling the battery manufactured in above (3) in a discharge state after repeating 10 cycles of charge and discharge at 2 C and the thickness of the layer of the negative electrode active material (T500) was measured by dismantling the battery manufactured in above (3) in a discharge state after repeating 500 cycles of charge and discharge at 2 C to determine the electrode expansion rate: $\{(T500/T10)\} \times 100$.

Example 1

Calcined coke having in which AR(60) value was 2.2 was pulverized with a bantam mill produced by Hosokawa Micron Corporation and subsequently coarse powder was excluded with a sieve having a mesh size of 32 μm. Next, the pulverized coke is subjected to air-flow screening with Turboclassifier TC-15N produced by Nisshin Engineering Inc. to obtain powder calcined coke 1, wherein D50 is 22.3 μm, substantially containing no particles each having a particle diameter of 1.0 μm or less.

Powder calcined coke 1 was subjected to graphitization treatment by heating over one week so that the maximum achieving temperature in Acheson furnace was adjusted to about 3,300° C. At this time, a crucible was provided with multiple oxygen inlets so as to allow air to flow in and out of the crucible during, before and after the graphitization treatment, and the oxidation of the powder was performed over about one week during the cooling process to obtain a graphite powder comprising scale-like particles.

The coarse powder was excluded from the obtained graphite powder with a sieve having a mesh size of 32 μm. The BET specific surface area, total pore volume, d002 and Lc of the resultant graphite powder were measured and the results are shown in Table 2. The initial charge and discharge efficiency e(0.5) and capacity C(0.5) of the battery produced by compressing the electrode material under pressure of 0.5 t/cm$^2$; the initial charge and discharge efficiency e(3.0), capacity C(3.0), density D(3.0) of the battery produced by compressing the electrode material under pressure of 3.0 t/cm²; and 1,000-cycle capacity retention rate were measured and also shown in Table 2.

Figure 1:
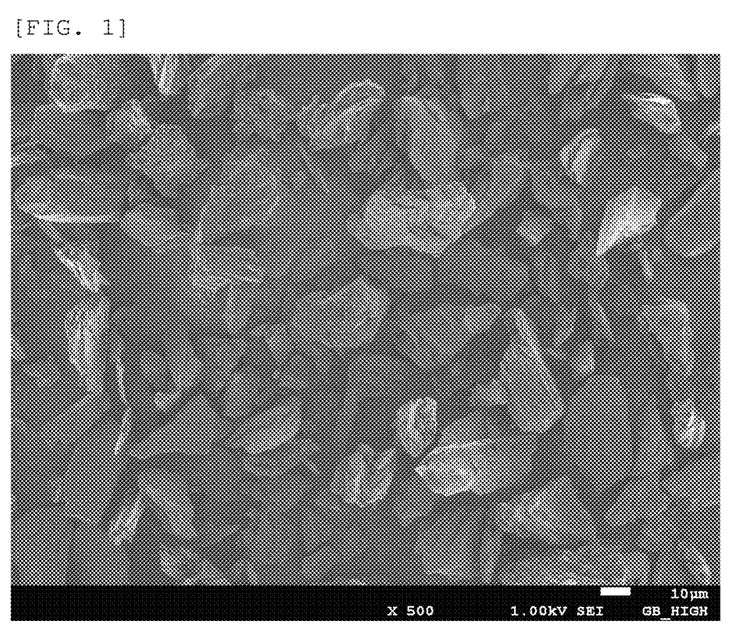
FIG. 1 shows an example of SEM images of the graphite powder obtained in Example 1.

Furthermore, the SEM of the obtained graphite powder is shown in FIG. 1.

Example 2

100 parts by mass of powder calcined coke 1 obtained in the same way as in Example 1, 2 parts by mass of petroleum pitch powder containing 1 mass % of quinoline insoluble and 48 mass % of beta-resin were fed in a planetary centrifugal mixer and dry blending was performed at 2,000 rpm for 20 minutes. After subjecting the obtained mixture to graphitization treatment by heating using a sealed crucible over one week so that the maximum achieving temperature in Acheson furnace was adjusted to about 3,300° C., coarse powder was excluded from the obtained graphite powder with a sieve having a mesh size of 32 μm. The oxidation of the powder was performed in air at 1,100° C. for one hour, and coarse powder was excluded from the obtained graphite powder with a sieve having a mesh size of 32 μm to obtain a graphite powder comprising scale-like particles. The results of the analysis of the obtained graphite powder are shown in Table 2.

Example 3

Chinese green coke was pulverized and classified in the same way as in Example 1 to obtain powder green coke 2, wherein D50 is 24.5 μm, substantially containing no particles each having a particle diameter of 1.0 μm or less. Green coke was calcined at 1,100° C. and AR(60) was determined to be 2.1.

Powder green coke 2 was subjected to graphitization treatment and oxidation treatment in the same way as in Example 1, and coarse powder was excluded from the obtained graphite powder with a sieve having a mesh size of 32 μm to obtain a graphite powder comprising scale-like particles. The results of the analysis of the obtained graphite powder are shown in Table 2.

Example 4

After graphitizing the mixture of powder calcined coke 1 described in Example 2 and the petroleum pitch powder in argon atmosphere at 3,200° C. for 30 minutes, the resultant was oxidized in the same way as in Example 2, and coarse powder was excluded with a sieve having a mesh size of 32 μm to obtain a graphite powder comprising scale-like particles. The results of the analysis of the obtained graphite powder are shown in Table 2.

Example 5

The graphite powder obtained in Example 1 was compressed under pressure of 3.0 t/cm². The results of the analysis of the graphite powder after compression are shown in Table 2.

Comparative Example 1

From the graphite powder obtained by mixing and graphitization in Example 2 without oxidization, coarse powder was excluded with a sieve having a mesh size of 32 μm to obtain a graphite powder comprising scale-like particles. The results of the analysis of the obtained graphite powder are shown in Table 2.

Comparative Example 2

From the graphite powder obtained by graphitization in Example 4 without oxidization, coarse powder was excluded with a sieve having a mesh size of 32 μm to obtain a graphite powder comprising scale-like particles. The results of the analysis of the obtained graphite powder are shown in Table 2.

Comparative Example 3

Natural graphite powder having D50 of 18.0 μm was mechanically treated to make the particles be aggregated to obtain spherical natural graphite powder. After uniformly mixing 90 parts by mass of the spherical natural graphite powder with 10 parts by mass of petroleum pitch powder containing 1 mass % of quinoline insoluble and 48 mass % of beta-resin, the mixture was calcined in nitrogen atmosphere at 2,800° C. and pulverized by a pin mill to obtain a graphite powder. The results of the analysis of the obtained graphite powder are shown in Table 2.

Comparative Example 4

The operations were carried out in the same way as in Example 1 except for using calcined coke in which AR(60) is 2.0 and a graphite powder comprising aggregated particles was obtained. The results of the analysis of the obtained graphite powder are shown in Table 2.

Figure 2:
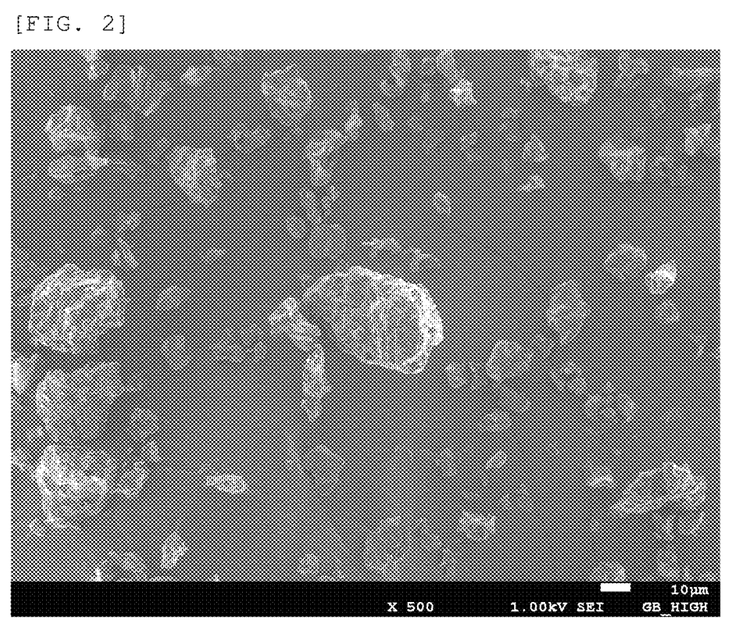
FIG. 2 shows an example of SEM images of the graphite powder obtained in Comparative Example 4.

Also, the SEM of the obtained graphite powder is shown in FIG. 2.

Comparative Example 5

The graphite powder obtained in Example 3 was compressed under pressure of 3.0 t/cm². The results of the analysis of the graphite powder after compression are shown in Table 2.

TABLE 2

|  | BET specific surface area (m²/g) | Total pore volume (μl/g) | d002 (nm) | Lc (nm) | e(0.5) (%) | C(0.5) (mAh/g) | e(3.0) (%) | C(3.0) (mAh/g) | D(3.0) (g/cc) | 1000-cycle capacity retention rate (%) | Electrode expansion rate (%) |
|---|---|---|---|---|---|---|---|---|---|---|---|
| Example 1 | 2.1 | 9.2 | 0.3360 | 143 | 87 | 352 | 91 | 352 | 1.73 | 91 | 107 |
| Example 2 | 2.5 | 14.9 | 0.3357 | 203 | 77 | 355 | 90 | 350 | 1.78 | 90 | 110 |
| Example 3 | 1.6 | 10.2 | 0.3357 | 142 | 82 | 336 | 91 | 340 | 1.69 | 91 | 122 |
| Example 4 | 1.8 | 8.8 | 0.3358 | 125 | 82 | 358 | 90 | 355 | 1.75 | 93 | 119 |
| Example 5 | 2.0 | 11.3 | 0.3357 | 182 | 89 | 351 | 90 | 353 | 1.71 | 91 | 118 |
| Comparative Example 1 | 1.1 | 7.5 | 0.3356 | 204 | 55 | 346 | 58 | 344 | 1.70 | 81 | 133 |
| Comparative Example 2 | 0.8 | 6.6 | 0.3359 | 107 | 62 | 337 | 63 | 340 | 1.71 | 76 | 140 |

TABLE 2-continued

|  | BET specific surface area (m²/g) | Total pore volume (μl/g) | d002 (nm) | Lc (nm) | e(0.5) (%) | C(0.5) (mAh/g) | e(3.0) (%) | C(3.0) (mAh/g) | D(3.0) (g/cc) | 1000-cycle capacity retention rate (%) | Electrode expansion rate (%) |
|---|---|---|---|---|---|---|---|---|---|---|---|
| Comparative Example 3 | 2.9 | 20.8 | 0.3354 | 209 | 91 | 358 | 91 | 359 | 1.81 | 66 | 155 |
| Comparative Example 4 | 2.3 | 6.6 | 0.3365 | 79 | 93 | 330 | 89 | 321 | 1.35 | 92 | 119 |
| Comparative Example 5 | 3.2 | 22.1 | 0.3354 | 223 | 92 | 357 | 91 | 355 | 1.82 | 64 | 161 |

The invention claimed is:

1. A negative electrode material for a battery electrode comprising a graphite powder,
wherein a total pore volume as determined by nitrogen gas adsorption method of the graphite powder is 8.0 μl/g to 20.0 μl/g, the particles of the graphite powder are scale-like particles, and a peak ratio (x) of a rhombohedral structure in the graphite powder obtained by the expression x=P2/(P1+P2) is 0.05 or less,
wherein P1 is an actually measured peak strength of a hexagonal structure (100) plane measured by powder X-ray diffraction, and P2 is an actually measured peak strength of a rhombohedral structure (101) plane by powder X-ray diffraction.

2. The negative electrode material for a battery electrode as claimed in claim 1, further comprising a metallic substance.

3. The negative electrode material for a battery electrode as claimed in claim 2, wherein the metallic substance comprises a metal that is capable of forming an alloy with an alkali metal and/or a metallic substance comprising an alkali metal alloy.

4. A negative electrode for a lithium battery, comprising a current collector and a negative electrode active material layer formed on the current collector, wherein the negative electrode active material layer comprises a binder and the negative electrode material for a battery electrode as claimed in claim 1.

5. The negative electrode for a lithium battery as claimed in claim 4, wherein the negative electrode material for a battery electrode further comprises a metallic substance.

6. The negative electrode for a lithium battery as claimed in claim 4, wherein the negative electrode active material layer is a compressed layer.

7. The negative electrode for a lithium battery as claimed in claim 5, wherein the negative electrode active material layer is a compressed layer.

8. A lithium ion battery comprising the negative electrode for a lithium battery as claimed in claim 4.

9. The lithium ion battery as claimed in claim 8, wherein the negative electrode material for a battery electrode further comprises a metallic substance.

10. The lithium ion battery as claimed in claim 8, wherein the negative electrode active material layer is a compressed layer.

11. The lithium ion battery as claimed in claim 9, wherein the negative electrode active material layer is a compressed layer.

* * * * *